United States Patent [19]

Currie

[11] 4,448,579
[45] May 15, 1984

[54] ARITHMETIC INSTRUCTION APPARATUS

[76] Inventor: Richard A. Currie, 833 S. Burgess Dr., Baton Rouge, La. 70815

[21] Appl. No.: 376,127

[22] Filed: May 7, 1982

[51] Int. Cl.³ .................... G09B 19/02; G06C 1/00
[52] U.S. Cl. .................................................. 434/203
[58] Field of Search ...................... 434/203, 204, 205

[56] References Cited

U.S. PATENT DOCUMENTS

| D. 9,303 | 5/1876 | Kendall | 434/203 |
|---|---|---|---|
| D. 181,754 | 12/1957 | Schott | D25/1 |
| D. 203,176 | 12/1965 | Kardach | D25/1 |
| D. 215,004 | 8/1969 | Dota | D25/1 |
| D. 217,911 | 6/1970 | Herold | D25/1 |
| 2,228,554 | 1/1941 | Brown | 434/203 |
| 2,857,686 | 10/1958 | Blake | 434/203 |
| 2,888,753 | 6/1959 | Swarts | 434/203 |
| 3,092,917 | 6/1963 | Podell | 434/203 |
| 3,455,034 | 7/1969 | Schott | 434/203 |
| 3,508,348 | 4/1970 | Harada | 434/203 |
| 3,731,401 | 5/1973 | Kodima | 434/203 |
| 3,758,962 | 9/1973 | Bagdasar | 434/205 |

FOREIGN PATENT DOCUMENTS 295723 5/1929 United Kingdom ................ 434/205

Primary Examiner—William H. Grieb
Attorney, Agent, or Firm—David L. Ray

[57] ABSTRACT

An educational teaching device which is formed in the shape of the hand or the foot of a human. In one embodiment of the invention, the educational device comprises a frame in the shape of a human hand having a palm, a thumb and four fingers, the frame having a first groove in the palm, a second groove in the thumb, and a third, fourth, fifth and sixth groove in the first finger, second finger, third finger and fourth finger respectively, the grooves containing one or more beads that can be manipulated to perform, and teach the student, various arithmetic operations. In another embodiment of the invention, the frame is in the shape of a human foot with a similar arrangement of grooves therein.

16 Claims, 4 Drawing Figures

ARITHMETIC INSTRUCTION APPARATUS

BACKGROUND OF THE INVENTION

The present invention relates to arithmetic instruction apparatuses and, in particular, relates to a teaching aid for assisting an instructor in teaching arithmetic functions to children.

Quite commonly when a child begins to learn arithmetic, counting is illustrated with the use of the fingers. The child is told he has ten fingers, and once he has learned to count to ten, he will use his fingers to count and to illustrate numbers. Even later on in life the fingers are commonly used for counting. For example, baseball umpires indicate the number of balls and strikes with their fingers, and public speakers often indicate the number of points they will make by holding up a corresponding number of fingers. The decimal system was very likely based on the number 10 because of the ten fingers.

Through the years a variety of mechanical devices and systems have been used to facilitate counting and arithmetic operations. The abacus is one of the oldest and most widely known mechanical devices. For example of various mechanical devices used for teaching and accomplishing certain arithmetic operations, see for example, U.S. Pat. Nos. 3,731,401; 3,508,348; 3,455,034; 3,092,917; 2,888,753; D 9303; D 181,754; D 203,176; and D 215,004.

However, the mechanical devices of the prior art are generally rectangular in outline and bear no relationship to the hands of the user. Thus a certain amount of abstract thinking is required which is sometimes a serious problem for certain youngsters learning to perform basic arithmetic operations.

There is therefore a need for a mechanical teaching device which can be mastered by the young student at a early stage in learning basic arithmetic functions.

SUMMARY OF THE INVENTION

In accordance with the present invention there is provided an educational teaching device which is formed in the shape of the hand or the foot of a human. In one embodiment of the invention, the educational device comprises a frame in the shape of a human hand having a palm, a thumb and four fingers, the frame having a first groove in the palm, a second groove in the thumb, and a third, fourth, fifth and sixth groove in the first finger, second finger, third finger and fourth finger respectively, the grooves containing one or more beads that can be manipulated to perform, and teach the student, various arithmetic operations. In another embodiment of the invention, the frame is in the shape of a human foot with a similar arrangement of grooves therein.

The present invention is advantageous because the beginning student in arithmetic can relate to the members of his body, i.e. the hands and/or feet. The invention combines the natural operations of counting on the fingers and provides a device which is easy to learn and fun to use. The use of the apparatus of the present invention actually shows the mechanics of arithmetic operations, not just answers. The various embodiments of the invention can comprise a single hand, a single foot, two hands or two feet. The device is simple to construct and relatively low in cost.

DESCRIPTION OF THE PREFERRED EMBODIMENTS

Figure 1:
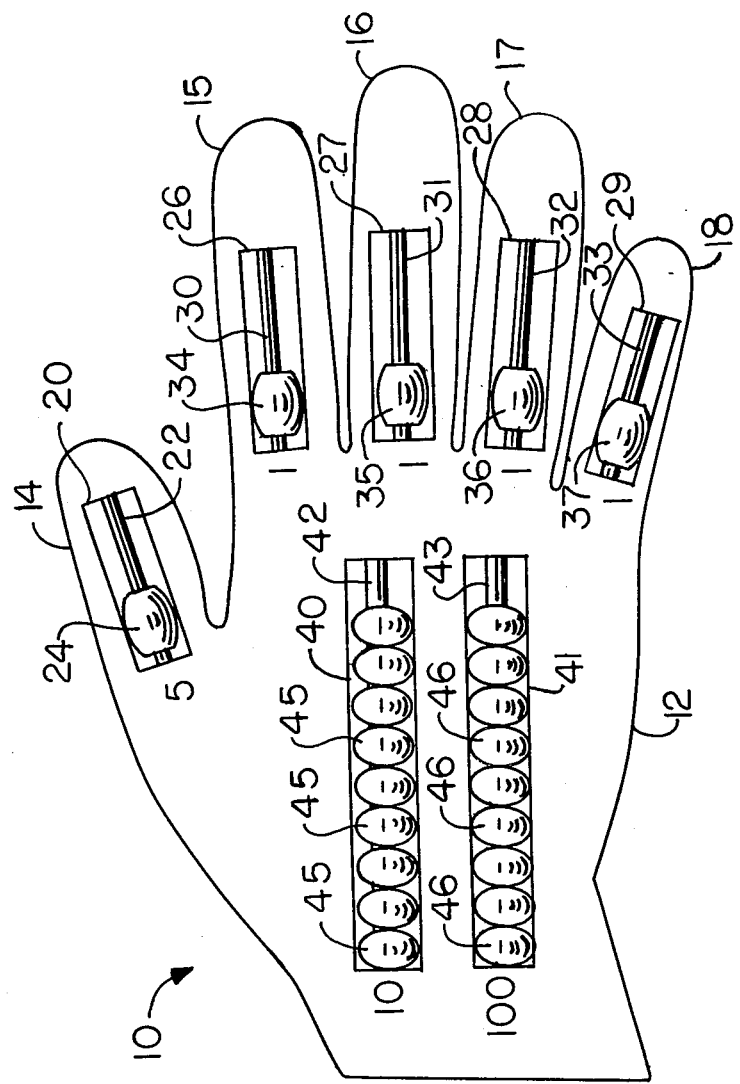
FIG. 1 a top plan view of the apparatus of the invention in the shape of single human hand.

Referring now to the drawings, in FIG. 1 is shown a first embodiment of the invention generally indicated by the numeral 10. The embodiment shown in FIG. 1 includes a frame 12 which is formed in the shape of a human hand having a thumb 14 and four fingers 15, 16, 17 and 18. The hand is preferably shaped to be approximately the same size as the users hand, so that it will fit easily in the hand of the user. Located in thumb 14 of frame 12 is a groove or slot 20. Preferably, the indicia "5" is located at the base of slot 20. Slot 20 has a rod or wire 22 therein which has a sliding counter or bead 24 mounted thereon. Similarly each of the fingers 15 through 18 have slots or grooves 26, 27, 28 and 29 therein, respectively, preferably with the indicia "1" at the base thereof. Each of the grooves or slots 26 through 29 have rods 30, 31, 32 and 33 therein which contain sliding counters 34, 35, 36 and 37 thereon. The groove or slots are sufficiently deep to permit the sliding counters to move freely on the rods. Preferably frame 12 has a depth of approximately ½ inch to 1 inch.

The grooves or slots are recessed downward into the frame 12 approximately one-half of its depth. However, if desired, the frame 12 could be very thin or thick relative to the diameter of the beads and the grooves or slots could be openings or holes completely through the entire depth of the frame.

Located in the palm portion of frame 12 are two slots 40 and 41 which also could be openings or holes completely through the frame if desired. The slots 40 and 41 have rods 42 and 43 therein upon which sliding counters 45 and 46 can slide. In the preferred embodiment shown in FIG. 1, two slots 40 and 41 are utilized and the indicia "10" and "100" are located at the base thereof. However, if desired, slot 41 could be eliminated with only one slot being utilized.

Figure 2:
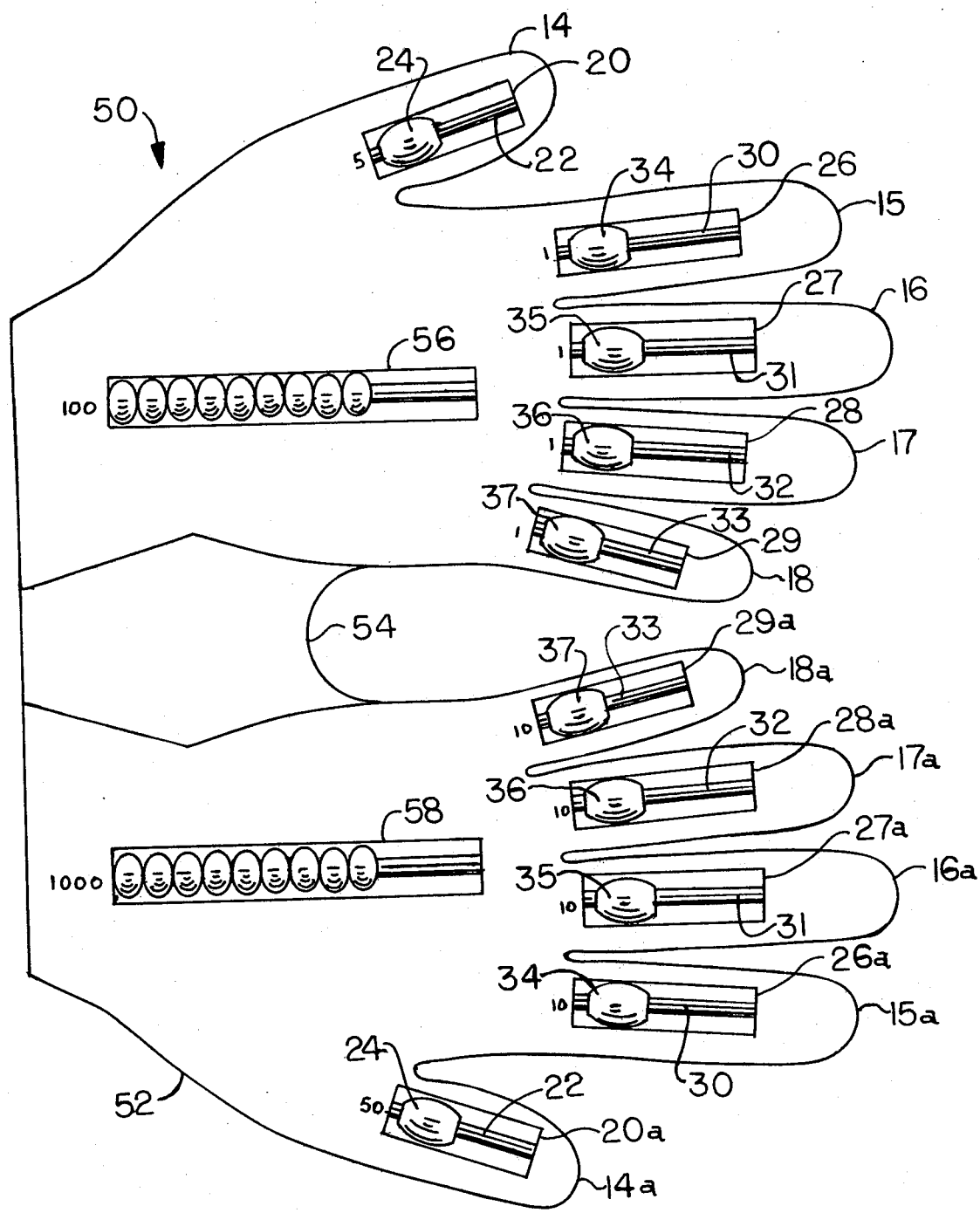
FIG. 2 is a top plan view of another embodiment of the invention wherein the frame is in the shape of two human hands.

In FIG. 2 is shown another embodiment of the invention generally indicated by the numeral 50. The embodiment shown in FIG. 2 includes a frame 52 which is formed in the shape of two human hands which are joined together by portion 54 to form one integral unit. The embodiment shown in FIG. 2 is similar to the embodiment shown in FIG. 1 exception that only one groove (56 and 58) per hand are located in the palms of the hands. Preferably, grooves 56 and 58 have the indicia "100" and "1000" at the base thereof. The fingers are identical to those shown in FIG. 1 and like numerals indicate like parts, with the exception that the thumb of the right hand has the indicia "50" at the base of slot 20a and the indicia "10" is located at the base of slots 26a through 29a.

Figure 3:
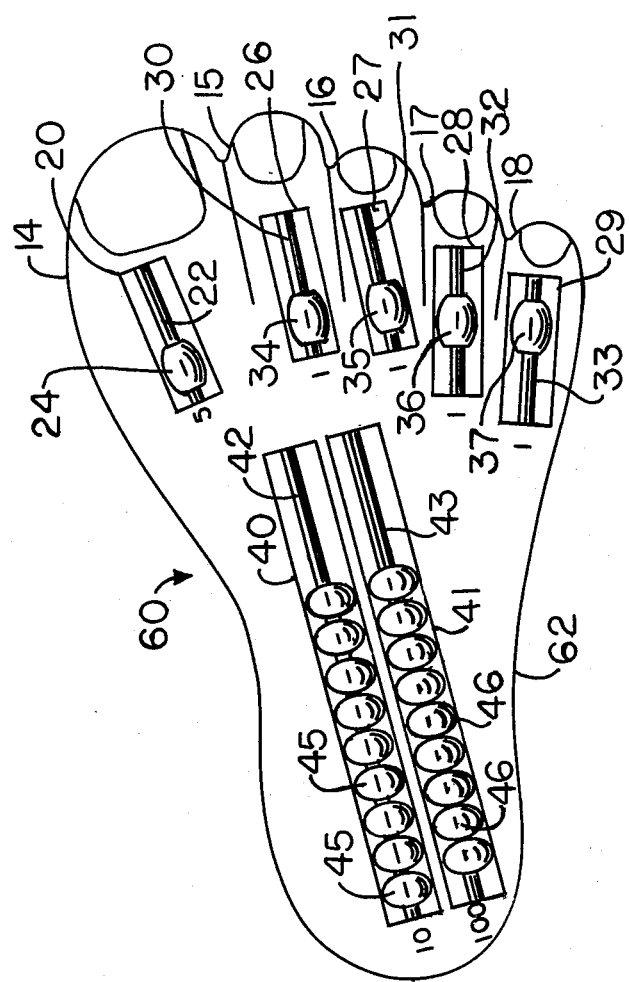
FIG. 3 is a top plan view of another embodiment of the invention in which the frame is in the shape of single human foot.

In FIG. 3 is shown still another embodiment of the invention generally indicated by the numeral 60. The embodiment shown in FIG. 3 has a frame 62 which is in the shape of a human foot. The big toe of the foot as shown in FIG. 3 corresponds to the thumb 14 of the hand shown in FIG. 1, the four toes corresponds to the four figners as shown in FIG. 1, and the instep of the foot corresponds to the palm of the hand shown in FIG. 1. Thus, like numerals indicate like parts. The embodiment shown in FIG. 3 operates in the same manner as the embodiment shown in FIG. 1.

Figure 4:
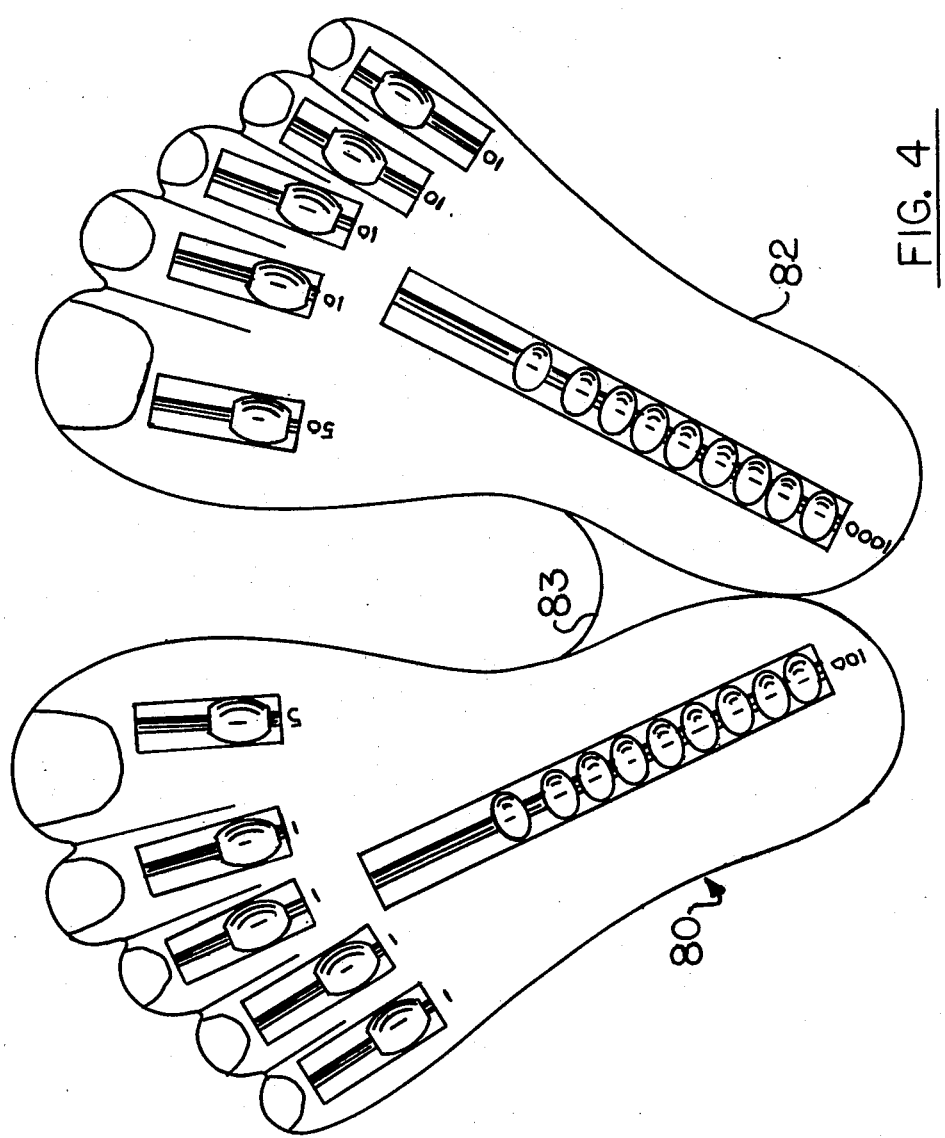
FIG. 4 is another embodiment of the invention in which the frame is in the shape of two human feet.

In FIG. 4 is shown an additional embodiment of the invention generally indicated by the numeral 80. In the embodiment shown in FIG. 4 frame 82 has the shape of two human feet which correspond to the two human hands shown in FIG. 4. The two human feet are joined by a member 83 to form one solid unit. In the embodiment shown in FIG. 4 the big toes correspond to the thumb 14 and similar notations are utilized. The embodiment of FIG. 4 functions in the same manner as the embodiment shown in FIG. 2.

Considerable modification of the device is possible in the materials in which the components of the device are made. For example, the frame, sliding counters, or beads and rods can be made of metal, plastic, wood or combinations thereof. The number of beads in the slots in the palm or the instep of the foot can be varied as desired.

It will be understood by those skilled in the art that it is possible to add, substract and perform other arithmetic operations by moving the beads individually, or in slots which contain more than one bead, by moving a single bead or groups of beads. In any position of the beads, a number is disclosed which correspond to the position of the beads. Likewise, more complex addition and substraction involving the carrying of numbers can be taught in direct association of numerical symbols with actual quantities (the number or position of the beads). The device can also be used for more complex operations, such as multiplication and division.

Although the preferred embodiments of the present invention have been disclosed and described in detail above, it should be understood that the invention is in no sense limited thereby, and its scope is to be determined by that of the following claims.

What is claimed is:

1. An educational teaching device formed in the shape of a human hand comprising a frame in the shape of a human hand having a palm, a thumb and four fingers, the frame having a first groove in the palm, a second groove in the thumb, a third groove in the first finger, a fourth groove in the second finger, a fifth groove in the third finger, and a sixth groove in the fourth finger, said grooves having one or more slidable beads therein which can be manipulated to perform various arithmetic operations.

2. The teaching device of claim 1 wherein said device has a second groove in the palm thereof containing one or more beads therein.

3. The teaching device of claim 1 wherein said grooves in said fingers contain only one bead.

4. The teaching device of claim 1 wherein said grooves are holes extending completely through said frame.

5. An educational teaching device formed in the shape of two human hands comprising a frame in the shape of two human hands joined together as an integral unit, each hand having a palm, a thumb and four fingers, the frame having a first groove in the palm, a second groove in the thumb, a third groove in the first finger, a fourth groove in the second finger, a fifth groove in the third finger, and a sixth groove in the fourth finger, said grooves having one or more slidable beads thereon which can be manipulated to perform various arithmetic operations.

6. The teaching device of claim 5 wherein said grooves in said fingers contain only one bead.

7. The teaching device of claim 5 wherein said grooves are holes extending completely through said frame.

8. The teaching device of claim 5 wherein said two human hands are aligned adjacent to each other in one plane.

9. The teaching device of claim 8 wherein said two human hands are joined at the wrists thereof.

10. An educational teaching device formed in the shape of a human foot comprising a frame in the shape of a human foot having an instep, a big toe, and four smaller toes, the frame having a first groove in the instep, a second groove in the big toe, a third groove in the first toe, a fourth groove in the second toe, a fifth groove in the third toe, and a sixth groove in the fourth toe, each of said grooves containing one or more slidable beads which can be manipulated to perform various arithmetic operations.

11. The teaching device of claim 10 wherein said device has a second groove in the instep thereof containing one or more beads therein.

12. The teaching device of claim 10 wherein said grooves in said toes contain only one bead.

13. The teaching device of claim 10 wherein said grooves are holes extending completely through said frame.

14. An educational teaching device formed in the shape of two human feet comprising a frame in the shape of two human feet joined together as an integral unit, each foot having an instep, a big toe, and four smaller toes, the frame having a first groove in the instep, a second groove in the big toe, a third groove in the first toe, a fourth groove in the second toe, a fifth groove in the third toe, and a sixth groove in the fourth toe, each of said grooves containing one or more slidable beads which can be manipulated to perform various arithmetic operations.

15. The teaching device of claim 14 wherein said grooves in said toes contain only one bead.

16. The teaching device of claim 14 wherein said grooves are holes extending completely through said frame.

* * * * *